(12) United States Patent
Fujii

(10) Patent No.: US 10,266,109 B2
(45) Date of Patent: Apr. 23, 2019

(54) LANE CHANGE ASSIST DEVICE FOR A VEHICLE

(71) Applicant: TOYOTA JIDOSHA KABUSHIKI KAISHA, Toyota-shi, Aichi-ken (JP)

(72) Inventor: Shota Fujii, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/848,121

(22) Filed: Dec. 20, 2017

(65) Prior Publication Data

US 2018/0178714 A1 Jun. 28, 2018

(30) Foreign Application Priority Data

Dec. 26, 2016 (JP) ................................. 2016-251657

(51) Int. Cl.
*B60Q 1/40* (2006.01)
*B60Q 1/34* (2006.01)
*G08G 1/16* (2006.01)
*B62D 15/02* (2006.01)
*B60W 30/18* (2012.01)

(52) U.S. Cl.
CPC ............. *B60Q 1/346* (2013.01); *B60Q 1/40* (2013.01); *B60W 30/18163* (2013.01); *B62D 15/0255* (2013.01); *G08G 1/167* (2013.01)

(58) Field of Classification Search
CPC .......... B60Q 1/34; B60Q 1/38; B60Q 1/2665; B60Q 1/346; B60Q 1/40; B60W 30/18163; B60W 50/10; B60W 2520/06; B62D 15/0255; G08G 1/167

USPC .... 340/435, 475, 425, 546, 476; 701/36, 96, 701/301
See application file for complete search history.

(56) References Cited

U.S. PATENT DOCUMENTS

| 5,660,454 A * | 8/1997 | Mori ...................... B60Q 1/085 362/466 |
| 2004/0100373 A1 * | 5/2004 | Ponziani ................ B60Q 1/346 340/476 |
| 2005/0155808 A1 * | 7/2005 | Braeuchle .......... B62D 15/0255 180/402 |

(Continued)

FOREIGN PATENT DOCUMENTS

| JP | 2005-138647 A | 6/2005 |
| JP | 2006-315491 A | 11/2006 |

(Continued)

*Primary Examiner* — Hoi C Lau
(74) *Attorney, Agent, or Firm* — Sughrue Mion, PLLC

(57) ABSTRACT

When a duration time period in which a turn signal lever is held at a first operation position P1L (P1R) is equal to or larger than an assist request confirmation time period, a driving support ECU starts a lane change assist control. When an operation force is released under a situation in which the turn signal lever positions at the first operation position, the turn signal lever returns to a neutral position PN. When the driving support ECU starts the lane change assist control, the driving support ECU continues flashing a turn signal until a turn signal turning-off condition depending on a state of the lane change assist control is established. When the turn signal lever is performed at a second operation position P2L (P2R) while the lane change assist control is being executed, the lane change assist control is stopped.

3 Claims, 9 Drawing Sheets

(56) References Cited

U.S. PATENT DOCUMENTS

| | | | | |
|---|---|---|---|---|
| 2005/0162266 A1* | 7/2005 | Mills | ........................ | B60Q 1/40 340/476 |
| 2005/0270145 A1* | 12/2005 | Kataoka | ................ | B60W 30/12 340/435 |
| 2006/0009910 A1* | 1/2006 | Ewerhart | ............ | B60W 30/143 701/301 |
| 2006/0025918 A1* | 2/2006 | Saeki | ................. | B60K 31/0008 701/96 |
| 2014/0309855 A1* | 10/2014 | Tran | ........................ | B60Q 1/38 701/36 |
| 2015/0022336 A1* | 1/2015 | Mueller | ................... | B60Q 1/40 340/477 |
| 2016/0114722 A1* | 4/2016 | Kim | ...................... | B60Q 1/346 701/36 |
| 2016/0167661 A1* | 6/2016 | Kuehne | ........... | B60W 30/18163 701/36 |
| 2017/0057404 A1* | 3/2017 | Park | ....................... | B60Q 1/346 |
| 2018/0178713 A1* | 6/2018 | Fujii | ...................... | B60Q 1/346 |
| 2018/0178714 A1* | 6/2018 | Fujii | ...................... | B60Q 1/346 |
| 2018/0178715 A1* | 6/2018 | Fujii | ...................... | B60Q 1/40 |
| 2018/0178716 A1* | 6/2018 | Fujii | ....................... | B60Q 1/40 |

FOREIGN PATENT DOCUMENTS

| | | |
|---|---|---|
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2009-274594 A | 11/2009 |
| JP | 2010-6279 A | 1/2010 |
| JP | 4929777 B2 | 5/2012 |
| JP | 2014-148293 A | 8/2014 |

* cited by examiner

LANE CHANGE ASSIST DEVICE FOR A VEHICLE

BACKGROUND OF THE INVENTION

1. Field of the Invention

The present invention relates to a lane change assist device configured to execute lane change assist control, which is control of assisting a steering operation for changing lanes.

2. Description of the Related Art

Hitherto, as proposed in Japanese Patent Application Laid-open No. 2009-274594, there has been known a lane change assist device configured to execute lane change assist control, which is control of assisting a steering operation (steering wheel operation) for changing lanes. The lane change assist device uses, for example, an electric power steering system to provide/generate a steering torque to a steering mechanism, to thereby change the lanes in which an own vehicle travels without the driver's steering operation.

The lane change assist device (referred to as "conventional device") proposed in Japanese Patent Application Laid-open No. 2009-274594, detects an operation performed by the driver on a turn signal operation unit, and starts the lane change assist control in response to the operation performed on the turn signal operation unit.

If the lane change can safely be performed under a state in which the operation performed on the turn signal operation unit is detected, the conventional device starts the lane change assist control. On the other hand, the driver may have an intention to change lanes by the driver's steering operation without receiving the lane change assist (without an assist of a lane change operation by the lane change assist control). Furthermore, the driver does not have an intention to change lanes immediately, but the driver may have an intention to notify in advance a driver of other vehicle of a plan for a lane change by intermittently flashing a turn signal. Even in such a case, when the driver performs an operation on the turn signal operation unit, the lane change assist control is started.

As understood from the above, the conventional device fails to recognize whether the operation performed on the turn signal operation unit represents a driver's intention to obtain/receive the lane change assist or a driver's intention to have the own vehicle change lanes by the driver's steering operation without receiving the lane change assist. Therefore, since the driver may not be able to obtain an operation which is along with the driver's intention, an operability of the conventional device is bad. If the conventional device includes another specific operation unit, the conventional device may be able to distinguish between such two driver's intentions using the specific operation unit. However, in such conventional device, the driver has to additionally operate the specific operation unit. Therefore, such a conventional device cannot improve the operability.

SUMMARY OF THE INVENTION

The present invention has been made in order to solve the above-mentioned problem, and has an object to provide a lane change assist device with good operability.

In order to achieve the above-mentioned object, according to one embodiment of the present invention, there is provided a lane change assist device for a vehicle, including:

lane change assist request detection means (10, S15-S18) for detecting a lane change assist request in response to an operation performed on a turn signal by a driver;

lane change assist control means (10, 20, S20) for starting lane change assist control to change lanes in which an own vehicle is traveling in response to the detection of the lane change assist request; and turn signal drive means (30) for intermittently flashing a turn signal;

wherein the turn signal lever is configured to be able to be performed selectively between a first operation position (P1L, P1R) which is a position at which the turn signal lever is rotated by a first stroke from a neutral position (PN) and at which the turn signal is intermittently flashed, and a second operation position (P2L, P2R) which is a position at which the turn signal lever is rotated by a second stroke larger than the first operation position from the neutral position and at which the turn signal is intermittently flashed, in each of a right turn operation direction and a left turn operation direction, and to return to the neutral position when an operation force is released under a situation in which the turn signal lever positions at the first operation position, wherein the lane change assist request detection means is configured to measure a time period in which the turn signal lever is held at the first operation position and to detect the lane change assist request when the measured time period is equal to or larger than an assist request confirmation time period set in advance (S15-S18), and wherein the lane change assist control means is configured to stop the lane change assist control when the turn signal lever is operated to the second operation position while the lane change assist control is being executed (S21:Yes, S12).

In the lane change assist device for the vehicle, the lane change request detection means detects the lane change assist request in response to the operation performed on the operation unit by the driver. The lane change assist control means starts the lane change assist control which is control of having the own vehicle change lanes in which the own vehicle is travelling. For example, the lane change assist control means provides/generates a steering torque to a steering mechanism to steer a steering wheel, to thereby control a travel direction of the own vehicle.

The turn signal lever is configured to be able to be operated selectively between the first operation position which is the position at which the turn signal lever is rotated by the first stroke from the neutral position and at which the turn signal (referred to as "turn lump" or "turn signal lump") is intermittently flashed, and the second operation position which is the position at which the turn signal lever is rotated by the second stroke larger (deeper) than the first operation position from the neutral position and at which the turn signal is intermittently flashed, in each of the right turn operation direction and the left turn operation direction, and to return to the neutral position when the operation force is released under the situation in which the turn signal lever positions at the first operation position. When the turn signal lever positions at the first operation position or the second operation position, the turn signal is intermittently flashed.

The lane change assist request detection means measures the time period in which the turn signal lever is held at the first operation position and detects the lane change assist request (in other words, determines that the lane change assist request is generated) when the measured time period is equal to or longer than the assist request confirmation time period set in advance. The lane change assist request is started in response to the detection of the lane change assist request. When the driver keeps the turn signal lever at the first operation position for the assist request confirmation time period or more, the driver can convey the driver's intention to obtain/receive the lane change assist to the lane change assist device. Therefore, the driver can obtain/receive the lane change assist which is along with the driver's intention.

When the turn signal lever is operated to the second operation position while the lane change assist control is being executed, the lane change assist is stopped.

In this manner, the present invention allows the driver to select an operation on the turn signal lever so as to realize either one of two cases, namely, a case where the driver receives the lane change assist, and a case where the driver has the vehicle change lanes by the driver's steering operation without the lane change assist. Further, the present invention allows the driver to stop the lane change assist control during the lane change assist control in accordance with the driver's intention.

Therefore, according to the present invention, the operability can be improved.

A feature of one aspect of the present invention resides in that the lane change assist device further includes turn signal control means (40) for controlling an actuation of the turn signal drive means (30) to intermittently flash the turn signal during a time period in which the turn signal lever positions at the first operation position or to intermittently flash the turn signal by a set number of times set in advance, in a case where the turn signal lever positions at the first operation position, and to intermittently flash the turn signal until a return operation is performed on the turn signal lever or a return operation is performed on a steering handle, in a case where the turn signal lever positions at the second operation position.

In the one aspect of the present invention, the turn signal is intermittently flashed during the time period in which the turn signal lever positions at the first operation position or is intermittently flashed by the set number of times set in advance, in a case where the turn signal lever positions at the first operation position. Thus, the driver moves the turn signal lever to the first operation position to intermittently flash the turn signal temporarily regardless of a steering state.

Intermittently-flash of the turn signal is continued until the return operation is performed on the turn signal lever or the return operation is performed on the steering handle, in a case where the turn signal lever positions at the second operation position. In other words, the intermittently-flashing of the turn signal is continued from the turn signal lever is operated to the second operation position until the return operation is performed on the turn signal lever or the return operation is performed on the steering handle. Therefore, the driver operates the turn signal lever to the second operation position to obtain a usual function that a conventional turn signal flashing device has, without the lane change assist control.

As a result, according to the one aspect of the present invention, the operability can be further improved.

A feature of one aspect of the present invention resides in that the lane change assist device further includes lane change turn signal control means (S51-S54) for controlling an actuation of the turn signal drive means to intermittently flash the turn signal from a start of the lane change assist control to an establishment of a turn signal turning-off condition set in advance.

According to the one aspect of the present invention, the intermittently-flashing of the turn signal is continued from the start of the lane change assist control to the establishment of the turn signal turning-off condition set in advance, in a case where the lane change assist control is executed. Therefore, the turn signal can be appropriately intermittently flashed while executing the lane change assist control.

For example, the turn signal turning-off condition may be set to be established when the lane change assist control is completed or before the lane change assist control is completed. In an example of the latter case, the turn signal turning-off condition may be set to be established when the own vehicle reaches a position that is a predetermined length short in a width direction of the own vehicle from a target position to complete the lane change assist control.

In the above description, in order to facilitate understanding of the invention, reference symbols used in embodiments of the present invention are enclosed in parentheses and are assigned to each of the constituent features of the invention corresponding to the embodiments. However, each of the constituent features of the invention is not limited to the embodiments defined by the reference symbols.

DESCRIPTION OF THE EMBODIMENTS

Referring to the accompanying drawings, a lane change assist device for a vehicle according to an embodiment of the present invention is described below.

Figure 1:
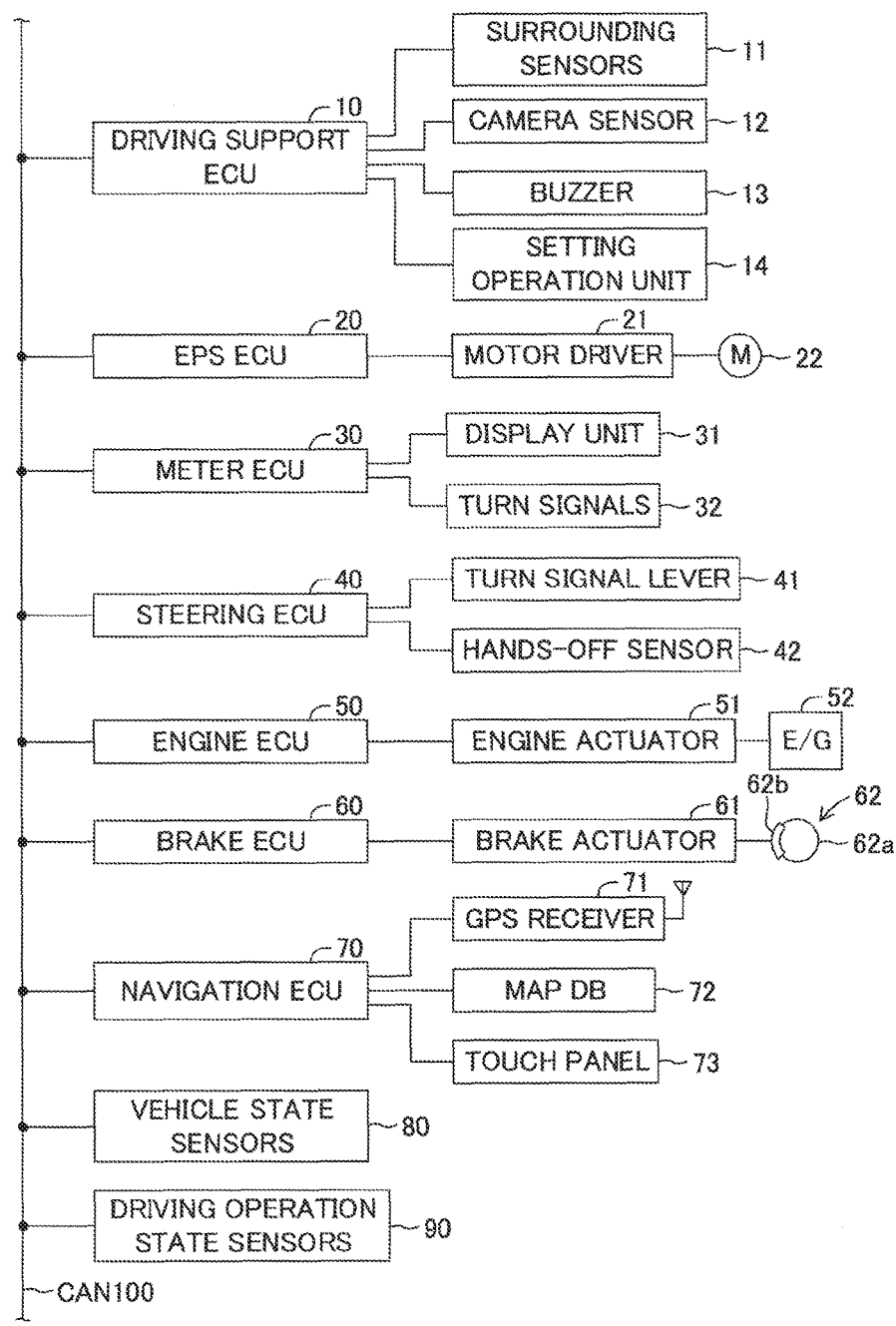
FIG. 1 is a schematic configuration diagram for illustrating a lane change assist device for a vehicle according to an embodiment of the present invention.

The lane change assist device according to the embodiment of the present invention is applied to a vehicle (hereinafter also referred to as "own vehicle" in order to distinguish from other vehicles), and as illustrated in FIG. 1, includes a driving support ECU 10, an electric power steering ECU 20, a meter ECU 30, a steering ECU 40, an engine ECU 50, a brake ECU 60, and a navigation ECU 70.

Those ECUs are electric control units each including a microcomputer as a main part, and are connected to one another so as to be able to mutually transmit and receive information via a controller area network (CAN) 100. The microcomputer herein includes a CPU, a ROM, a RAM, a nonvolatile memory, an interface I/F, and the like. The CPU executes instructions (programs and routines) stored in the ROM to realize various functions. Some or all of those ECUs may be integrated into one ECU.

Further, a plurality of types of vehicle state sensors 80 configured to detect a vehicle state and a plurality of types of driving operation state sensors 90 configured to detect a driving operation state are connected to the CAN 100. Examples of the vehicle state sensors 80 include a vehicle speed sensor configured to detect a travel speed of the vehicle, a front-rear G sensor configured to detect an acceleration in a front-rear direction of the vehicle, a lateral G sensor configured to detect an acceleration in a lateral direction of the vehicle, and a yaw rate sensor configured to detect a yaw rate of the vehicle.

Examples of the driving operation state sensors 90 include an accelerator operation amount sensor configured to detect an operation amount of an accelerator pedal, a brake operation amount sensor configured to detect an operation amount of a brake pedal, a brake switch configured to detect presence or absence of the operation on the brake pedal, a steering angle sensor configured to detect a steering angle, a steering torque sensor configured to detect a steering torque, and a shift position sensor configured to detect a shift position of a transmission.

Information (hereinafter referred to as "sensor information") detected by the vehicle state sensors 80 and the driving operation state sensors 90 is transmitted to the CAN 100. In each ECU, the sensor information transmitted to the CAN 100 can be used as appropriate. The sensor information is information of a sensor connected to a specific ECU, and may be transmitted from the specific ECU to the CAN 100. For example, the accelerator operation amount sensor may be connected to the engine ECU 50. In this case, the sensor information representing the accelerator operation amount is transmitted from the engine ECU 50 to the CAN 100. For example, the steering angle sensor may be connected to the steering ECU 40. In this case, the sensor information representing the steering angle is transmitted from the steering ECU 40 to the CAN 100. The same applies to the other sensors. Further, there may be employed a configuration in which, without interpolation of the CAN 100, the sensor information is transmitted and received through direct communication between specific ECUs.

Figure 2:
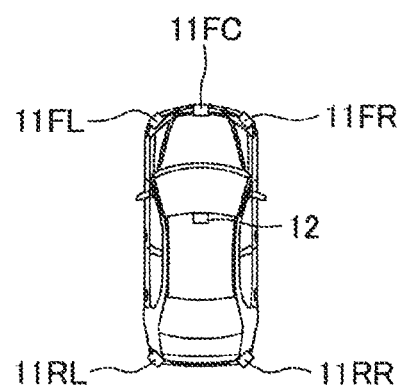
FIG. 2 is a plan view for illustrating disposing positions of surrounding sensors and a camera sensor.

The driving support ECU 10 is a control device serving as a central device for performing driving support for a driver, and executes lane change assist control, lane trace assist control, and adaptive cruise control. As illustrated in FIG. 2, a front-center surrounding sensor 11FC, a front-right surrounding sensor 11FR, a front-left surrounding sensor 11FL, a rear-right surrounding sensor 11RR, and a rear-left surrounding sensor 11RL are connected to the driving support ECU 10. The surrounding sensors 11FC, 11FR, 11FL, 11RR, and 11RL are radar sensors, and basically have the same configuration as each other except that the sensors have different detection regions. In the following, the surrounding sensors 11FC, 11FR, 11FL, 11RR, and 11RL are referred to as "surrounding sensors 11" when the sensors are not required to be individually distinguished from one another.

Each of the surrounding sensors 11 includes a radar transceiver and a signal processor (not shown). The radar transceiver radiates a radio wave in a millimeter waveband (hereinafter referred to as "millimeter wave"), and receives a millimeter wave (that is, reflected wave) reflected by a three-dimensional object (e.g., other vehicles, pedestrian, bicycle, and building) present within a radiation range. The signal processor acquires, every time a predetermined time period elapses, information (hereinafter referred to as "surrounding information") representing, for example, a distance between the own vehicle and the three-dimensional object, a relative speed between the own vehicle and the three-dimensional object, and a relative position (direction) of the three-dimensional object with respect to the own vehicle based on, for example, a phase difference between the transmitted millimeter wave and the received reflected wave, an attenuation level of the reflected wave, and a time period required from transmission of the millimeter wave to reception of the reflected wave. Then, the signal processor transmits the surrounding information to the driving support ECU 10. The surrounding information can be used to detect a front-rear direction component and a lateral direction component in the distance between the own vehicle and the three-dimensional object and a front-rear direction component and a lateral direction component in the relative speed between the own vehicle and the three-dimensional object.

As illustrated in FIG. 2, the front-center surrounding sensor 11FC is disposed at a front-center portion of a vehicle body, and detects a three-dimensional object present in a front region of the own vehicle. The front-right surrounding sensor 11FR is disposed at a front-right corner portion of the vehicle body, and mainly detects a three-dimensional object present in a front-right region of the own vehicle. The front-left surrounding sensor 11FL is disposed at a front-left corner portion of the vehicle body, and mainly detects a three-dimensional object present in a front-left region of the own vehicle. The rear-right surrounding sensor 11RR is disposed at a rear-right corner portion of the vehicle body, and mainly detects a three-dimensional object present in a rear-right region of the own vehicle. The rear-left surrounding sensor 11RL is disposed at a rear-left corner portion of the vehicle body, and mainly detects a three-dimensional object present in a rear-left region of the own vehicle. In the following, the three-dimensional object detected by the surrounding sensor 11 is sometimes referred to as an "object".

In this embodiment, the surrounding sensors 11 are radar sensors, but other sensors such as clearance sonars can be employed instead.

Further, a camera sensor 12 is connected to the driving support ECU 10. The camera sensor 12 includes a camera unit and a lane recognition unit configured to analyze image data obtained based on an image taken by the camera unit to recognize a white line(s) of a road. The camera sensor 12 (camera unit) photographs a landscape in front (ahead) of the own vehicle. The camera sensor 12 (lane recognition unit) supplies information relating to the recognized white line(s) to the driving support ECU 10.

Figure 3:
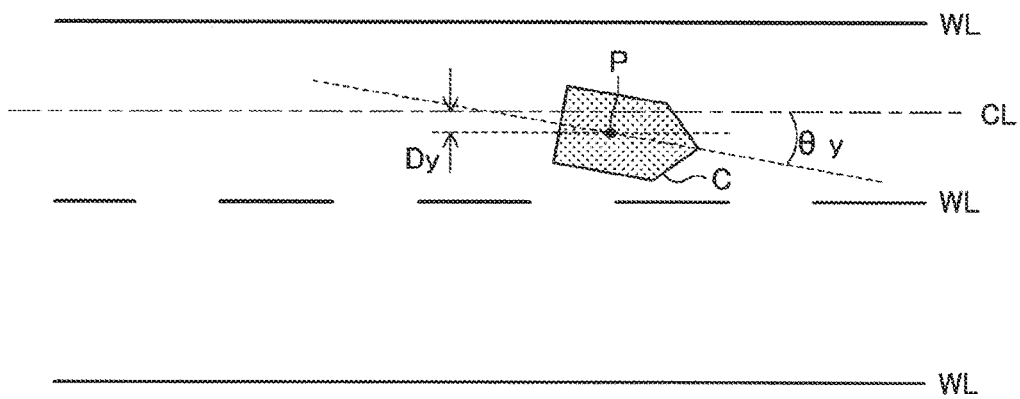
FIG. 3 is a diagram for illustrating lane-related vehicle information.

As illustrated in FIG. 3, the driving support ECU 10 sets/determines a lane center line CL corresponding to a center position in a width direction of right and left white lines WL in a lane in which the own vehicle is traveling based on the information supplied from the camera sensor 12. The lane center line CL is used as a target travel line in the lane trace assist control to be described later. Further, the driving support ECU 10 calculates a curvature Cu of a curve of the lane center line CL.

Further, the driving support ECU 10 calculates the position and the direction of the own vehicle in the lane sectioned by the right and left white lines WL. For example, as illustrated in FIG. 3, the driving support ECU 10 calculates a distance Dy in a road width direction between a reference point P (e.g., position of center of gravity) of an own vehicle C and the lane center line CL, that is, the distance Dy by which the own vehicle C is shifted (deviates) from the lane center line CL in the road width direction. This distance Dy is referred to as "lateral difference Dy". Further, the driving support ECU 10 calculates an angle formed between the direction of the lane center line CL and the direction in which the own vehicle C faces, that is, an angle $\theta y$ by which the direction in which the own vehicle C faces is shifted (deviates) in a horizontal direction from the direction of the lane center line CL. This angle $\theta y$ is referred to as "yaw angle $\theta y$". In the following, information (Cu, Dy, and $\theta y$) representing the curvature Cu, the lateral difference Dy, and the yaw angle $\theta y$ is referred to as "lane-related vehicle information".

Further, the camera sensor 12 also supplies, to the driving support ECU 10, information relating to the white line, for example, the type of the detected white line (solid line or broken line), a distance (lane width) between the right and left adjacent white lines, and the shape of the white line, on not only the lane of the own vehicle but also on adjacent lanes. When the white line is a solid line, the vehicle is inhibited from crossing the white line to change the lanes. Otherwise, e.g., when the white line is a broken line (white line intermittently formed at certain intervals), the vehicle is allowed to cross the white line to change lanes. The lane-related vehicle information (Cu, Dy, and $\theta y$) and the information relating to the white line(s) are collectively referred to as "lane information".

In this embodiment, the driving support ECU 10 calculates the lane-related vehicle information (Cu, Dy, and $\theta y$). Alternatively, the camera sensor 12 may be configured to calculate the lane-related vehicle information (Cu, Dy, and $\theta y$) to supply the calculation result to the driving support ECU 10.

Further, the camera sensor 12 can also detect a three-dimensional object present in front (ahead) of the own vehicle based on the image data. Therefore, not only the lane information but also front surrounding information may be acquired through calculation. In this case, for example, there may be provided a synthesis processor (not shown) configured to synthesize the surrounding information acquired by the front-center surrounding sensor 11FC, the front-right surrounding sensor 11FR, and the front-left surrounding sensor 11FL and the surrounding information acquired by the camera sensor 12 to generate front surrounding information having a high detection accuracy, and the surrounding information generated by the synthesis processor may be supplied to the driving support ECU 10 as the front surrounding information on the own vehicle.

A buzzer 13 is connected to the driving support ECU 10. The buzzer 13 receives a buzzer sounding signal as input from the driving support ECU 10 and produces a sound. The driving support ECU 10 sounds the buzzer 13 when, for example, the driving support ECU 10 notifies the driver of a driving support situation, or when the driving support ECU 10 alerts the driver.

In this embodiment, the buzzer 13 is connected to the driving support ECU 10, but the buzzer 13 may be connected to other ECUs, for example, a notification ECU (not shown) dedicated for notification, and the buzzer 13 may be sounded by the notification ECU. In this case, the driving support ECU 10 transmits a buzzer sounding command to the notification ECU.

Further, instead of or in addition to the buzzer 13, a vibrator for transmitting vibration for notification to the driver may be provided. For example, the vibrator is provided to a steering wheel to vibrate the steering wheel, to thereby alert the driver.

The driving support ECU 10 executes the lane change assist control, the lane trace assist control, and the adaptive cruise control based on the surrounding information supplied from the surrounding sensors 11, the lane information obtained based on the white line recognition by the camera sensor 12, the vehicle state detected by the vehicle state sensors 80, the driving operation state detected by the driving operation state sensors 90, and the like.

A setting operation unit 14 to be operated by the driver is connected to the driving support ECU 10. The setting operation unit 14 is an operation unit for performing setting or the like regarding whether or not to execute each of the lane change assist control, the lane trace assist control, and the adaptive cruise control. The driving support ECU 10 receives a setting signal as input from the setting operation unit 14 to determine whether or not to execute each control. In this case, when the execution of the adaptive cruise control is not selected, the lane change assist control and the lane trace assist control are also automatically set to be unexecuted. Further, when the execution of the lane trace assist control is not selected, the lane change assist control is also automatically set to be unexecuted.

Further, the setting operation unit 14 has a function of inputting parameters or the like representing the preference of the driver when the above-mentioned control is executed.

The electric power steering ECU 20 is a control device for an electric power steering device. In the following, the electric power steering ECU 20 is referred to as an "EPS ECU 20". The EPS ECU 20 is connected to a motor driver 21. The motor driver 21 is connected to a steering motor 22. The steering motor 22 is integrated/incorporated into a "steering mechanism including the steering wheel, a steering shaft coupled to the steering wheel, a steering gear mechanism, and the like" (not shown) of the vehicle. The EPS ECU 20 detects the steering torque that is input by the driver to the steering wheel (not shown) by a steering torque sensor mounted in the steering shaft, and controls energization to the motor driver 21 based on the steering torque to drive the steering motor 22. The assist motor is driven as described above so that the steering torque is applied to the steering mechanism, and thus the steering operation of the driver is assisted.

Further, when the EPS ECU 20 receives a steering command from the driving support ECU 10 via the CAN 100, the EPS ECU 20 drives the steering motor 22 at a control amount expressed by the steering command to generate a steering torque. This steering torque represents a torque to be applied to the steering mechanism in response to the steering command from the driving support ECU 10, which does not require the driver's steering operation (steering wheel operation) unlike a steering assist torque to be applied for alleviating the driver's steering operation described above.

The meter ECU 30 is connected to a display unit 31 and right and left turn signals 32 (meaning turn signal lamps and sometimes also referred to as "turn lamps"). The display unit 31 is, for example, a multi-information display mounted in front of a driver's seat, and displays various types of information in addition to values measured by meters, for example, a vehicle speed. For example, when the meter ECU 30 receives a display command in accordance with the driving support state from the driving support ECU 10, the meter ECU 30 displays a screen instructed in the display command on the display unit 31. As the display unit 31, instead of or in addition to the multi-information display, a head-up display (not shown) can also be employed. When the head-up display is employed, it is preferred to provide a dedicated ECU for controlling the display on the head-up display.

Further, the meter ECU 30 includes a turn signal drive circuit (not shown). When the meter ECU 30 receives a turn signal flashing command via the CAN 100, the meter ECU 30 intermittently flashes the turn signal 32 arranged in a right or left direction instructed by the turn signal flashing command. Further, while the meter ECU 30 intermittently flashes the turn signal 32, the meter ECU 30 transmits, to the CAN 100, turn signal flashing information representing that the turn signal 32 is in an intermittently flashing state. Therefore, other ECUs can recognize the intermittently flashing state of the turn signal 32.

The steering ECU 40 is connected to a turn signal lever 41 and a hands-off sensor 42. The turn signal lever 41 is an operation unit for working (intermittently flashing) the turn signal 32, and is mounted in a steering column. The turn signal lever 41 is mounted to be swingable at a two-stage operation stroke about a support shaft in each of a clockwise operation direction and a counterclockwise operation direction.

Figure 4:
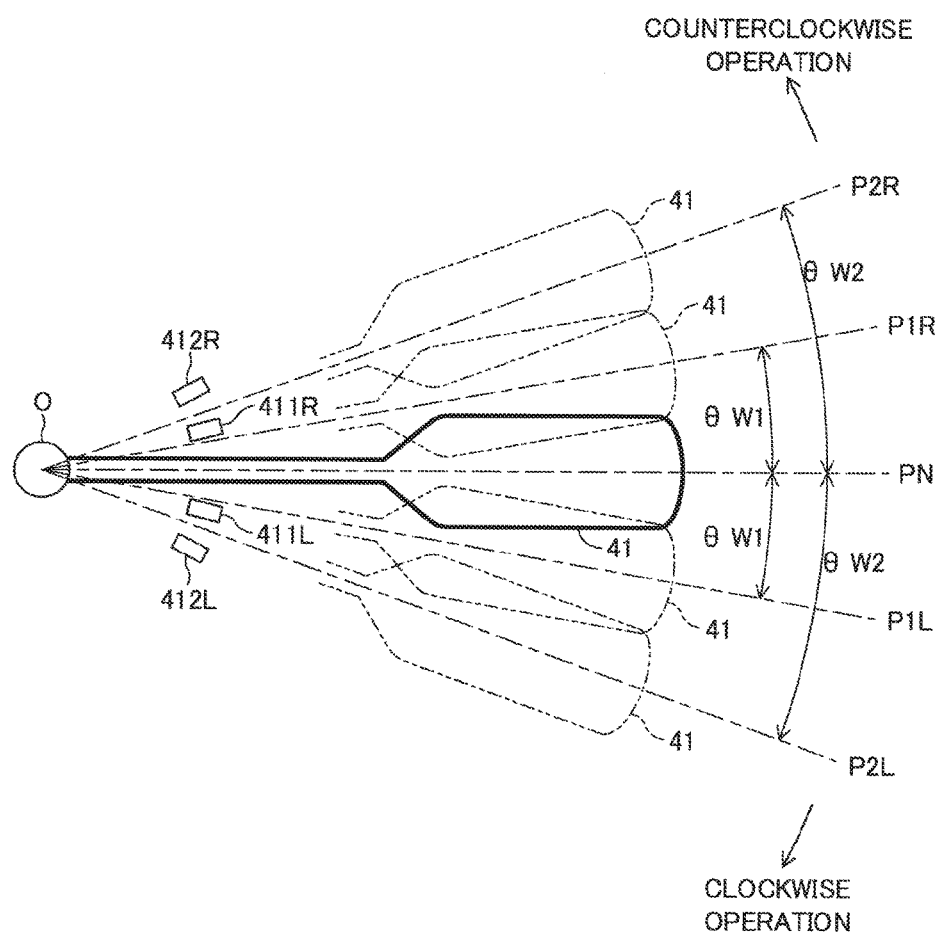
FIG. 4 is a diagram for illustrating actuation of a turn signal lever.

As illustrated in FIG. 4, the turn signal lever 41 is configured to be able to be operated selectively between a first operation position P1L (P1R), which is a position at which the turn signal lever 41 is rotated by a first stroke from a neutral position PN (rotated by a first angle $\theta W1$ about a support shaft O), and a second operation position P2L (P2R), which is a position at which the turn signal lever 41 is rotated by a second stroke larger than the first stroke and which is deeper than the first operation position P1L (P1R) from the neutral position PN (rotated by a second angle $\theta W2$ ($>\theta W1$) about the support shaft O), in each of the clockwise operation direction and the counterclockwise operation direction. The neutral position PN is a position obtained under a state in which the turn signal lever 41 is not operated, that is, a position at which the turn signal 32 is turned off.

When the driver tilts the turn signal lever 41 to the first operation position P1L (P1R), the turn signal lever 41 provides a click feeling to the driver. When the operation force to the turn signal lever 41 is released from this state, the turn signal lever 41 is mechanically returned to the neutral position PN by a returning mechanism (not shown), for example, a spring. Further, when the driver tilts the turn signal lever 41 to the second operation position P2L (P2R), the turn signal lever 41 is held at the second operation position P2L (P2R) by a mechanical lock mechanism (not shown) even when the operation force is released.

The turn signal lever 41 includes a first switch 411L (411R) that turns on only when the turn signal lever 41 is tilted to the first operation position P1L (P1R), and a second switch 412L (412R) that turns on only when the turn signal lever 41 is tilted to the second operation position P2L (P2R).

The first switch 411L (411R) transmits an ON signal to the steering ECU 40 while the turn signal lever 41 is located at the first operation position P1L (P1R), and the second switch 412L (412R) transmits an ON signal to the steering ECU 40 while the turn signal lever 41 is located at the second operation position P2L (P2R). The operation positions and switches with reference symbols in parenthesis in the description above represent the operation positions and the switches relating to the counterclockwise operation direction.

Under a state in which the turn signal lever 41 is held at the second operation position P2L (P2R), when the steering wheel is reversely rotated to be returned to the neutral position, or when the driver operates the turn signal lever 41 to return the turn signal lever 41 in the neutral position direction, the locking by the lock mechanism is released, and the turn signal lever 41 is returned to the neutral position PN. That is, when the turn signal lever 41 is operated to the second operation position P2L (P2R), the turn signal lever 41 acts in the same manner as a turn signal flashing device which has been hitherto carried out generally. In the following, the operation of tilting the turn signal lever 41 to the first operation position P1L (P1R) is referred to as "shallow pressing operation", and the operation of tilting the turn signal lever 41 to the second operation position P2L (P2R) is referred to as a "deep pressing operation".

Such a turn signal lever configured to switch a switch signal at a two-stage operation stroke is known in, for example, Japanese Patent Application Laid-open No. 2005-138647. This known configuration can be employed also in this embodiment.

The steering ECU 40 transmits, to the driving support ECU 10, a monitoring signal representing presence/absence of the shallow pressing operation on the turn signal lever 41, that is, an on/off state of the first switch 411L (411R), and a monitoring signal representing presence/absence of the deep pressing operation on the turn signal lever 41, that is, an on/off state of the second switch 411L (411R). In the following, the monitoring signal representing the on/off state of the first switch 411L (411R) is referred to as "shallow pressing operation monitoring signal", and the monitoring signal representing the on/off state of the second switch 412L (412R) is referred to as a "deep pressing operation monitoring signal". Each of the shallow pressing operation monitoring signal and the deep pressing operation monitoring signal includes a signal for identifying the operation direction (right/left direction) of the turn signal lever 41.

Further, the steering ECU 40 intermittently flashes the turn signal 32 arranged on a side corresponding to the direction in which the turn signal lever 41 is operated while the first switch 411L (411R) is turned on. The steering ECU 40 transmits, to the meter ECU 30, a turn signal flashing command for designating the operation direction (right/left direction) of the turn signal lever 41 so that the turn signal 32 is to be intermittently flashed while the first switch 411L (411R) is turned on. While the meter ECU 30 receives the turn signal flashing command, the meter ECU 30 intermittently flashes the turn signal 32 arranged on the side corresponding to the designated direction. Therefore, the driver can perform the shallow pressing operation on the turn signal lever 41 to intermittently flash the turn signal 32.

When a period in which the first switch 411L (411R) is turned on is shorter than a minimum flashing time period set in advance (that is, the number of times that the turn signal 32 flashes is smaller than the minimum number of times of flashing), the steering ECU 40 may transmit the turn signal flashing command to the meter ECU 30 for the minimum flashing time period so as to ensure the minimum number of times of flashing. In this case, the driver is only required to instantaneously perform the shallow pressing operation on the turn signal lever 41 to intermittently flash the turn signal 32 by a set number of times (minimum number of times of flashing). Further, when the first switch 411L (411R) is turned on, the steering ECU 40 may transmit the turn signal flashing command to the meter ECU 30 for a time period corresponding to a set number of times so that the turn signal 32 intermittently flashes the set number of times regardless of the time period in which the first switch 411L (411R) is turned on.

Further, the steering ECU 40 intermittently flashes the turn signal 32 arranged on a side corresponding to the operation direction while the second switch 412L (412R) is turned on. In this case, while the second switch 412L (412R) is turned on, the steering ECU 40 transmits, to the meter ECU 30, a turn signal flashing command for designating the operation direction (right/left direction). While the meter ECU 30 receives the turn signal flashing command, the meter ECU 30 intermittently flashes the turn signal 32 arranged on the side corresponding to the designated direction. Therefore, when the deep pressing operation is performed on the turn signal lever 41, the intermittently flashing of the turn signal 32 continues from when the deep pressing operation is started to when the returning operation is performed on the turn signal lever 41 or on the steering wheel.

The driving support ECU 10 receives the shallow pressing operation monitoring signal and the deep pressing operation monitoring signal. The driving support ECU 10 measures an ON duration time period of the shallow pressing operation monitoring signal (duration time period during which the first switch 411L (411R) is turned on, that is, duration time period during which the turn signal lever 41 is held at the first operation position P1L (P1R)), and determines whether or not the ON duration time period is equal to or longer than an assist request confirmation time period (e.g., one second) set in advance. When the ON duration time period of the shallow pressing operation monitoring signal is equal to or longer than the assist request confirmation time period, the driving support ECU 10 determines that the driver is making a request for the lane change assist.

Therefore, the shallow pressing operation on the turn signal lever 41 is an operation for requesting the lane change assist request operation for the driver to request the lane change assist. When the shallow pressing operation continues for the assist request confirmation time period or more, the driver's lane change assist request is confirmed. That is, when the shallow pressing operation continues for the assist request confirmation time period or more, the driving support ECU 10 detects the driver's lane change assist request. The lane change assist control to be described later is started based on the detection of the lane change assist request.

Further, when the deep pressing operation monitoring signal is turned on (when the turn signal lever 41 is operated to the second operation position P2L (P2R)), the driving support ECU 10 does not execute the steering assist control (LTA and LCA to be described later). That is, when the deep pressing operation monitoring signal is turned on while the steering assist control is executed, the driving support ECU 10 stops the steering assist control, and does not start the steering assist control under a situation in which the deep pressing operation monitoring signal is turned on.

In this embodiment, when the deep pressing operation is performed on the turn signal lever 41, the turn signal lever 41 is locked at that position even when the driver releases the operation force. Alternatively, even when the deep pressing operation is performed, similarly to the shallow pressing operation, the turn signal lever 41 may be automatically returned to the neutral position by a mechanical returning mechanism (not shown) when the driver releases the operation force. In the case of this configuration, even when the second switch 412L (412R) is switched from the ON state to the OFF state, the steering ECU 40 continues to transmit the turn signal flashing command of the turn signal 32 arranged on the side corresponding to the operation direction until the steering wheel is detected to return to the vicinity of the neutral position based on the steering angle.

The hands-off sensor 42 is a sensor configured to detect that the driver is not holding the steering wheel. The hands-off sensor 42 transmits a hands-off detection signal representing whether or not the driver is holding the steering wheel to the driving support ECU 10 via the CAN 100. While the lane change assist control and the lane trace assist control are executed, when a state in which the driver does not hold the steering wheel continues for a hands-off determination time period set in advance or more, the driving support ECU 10 determines that a "hands-off state" holds true. When the driving support ECU 10 determines that the hands-off state holds true, the driving support ECU 10 sounds the buzzer 13 to alert the driver. This alerting is referred to as "hands-off warning".

The engine ECU 50 is connected to an engine actuator 51. The engine actuator 51 is an actuator for changing an operation state of an internal combustion engine 52. In this embodiment, the internal combustion engine 52 is a gasoline fuel injection, spark ignition, multi-cylinder engine, and includes a throttle valve for adjusting an intake air amount. The engine actuator 51 includes at least a throttle valve actuator for changing an opening degree of the throttle valve. The engine ECU 50 can drive the engine actuator 51, thereby changing a torque generated by the internal combustion engine 52. The torque generated by the internal combustion engine 52 is transmitted to drive wheels (not shown) via a transmission (not shown). Thus, the engine ECU 50 can control the engine actuator 51 to control a driving force of the own vehicle, thereby changing an acceleration state (acceleration).

The brake ECU 60 is connected to a brake actuator 61. The brake actuator 61 is provided in a hydraulic circuit between a "master cylinder (not shown) configured to pressurize a working fluid in response to a stepping force on a brake pedal" and "friction brake mechanisms 62 provided at the front/rear left/right wheels". The friction brake mechanism 62 includes a brake disk 62a fixed to the wheel and a brake caliper 62b fixed to a vehicle body. The brake actuator 61 is configured to adjust a hydraulic pressure supplied to a wheel cylinder included in the brake caliper 62b in accordance with an instruction from the brake ECU 60 to use the hydraulic pressure to operate the wheel cylinder, thereby pressing a brake pad against the brake disk 62a and generating a friction braking force. Thus, the brake ECU 60 can control the brake actuator 61, thereby controlling the braking force of the own vehicle.

The navigation ECU 70 includes a GPS receiver 71 configured to receive a GPS signal for detecting a current position of the own vehicle, a map database 72 having map information and the like stored therein, and a touch panel (touch panel-type display) 73. The navigation ECU 70 identifies the position of the own vehicle at the current time point based on the GPS signal, and performs various types of calculation processing based on the position of the own vehicle and the map information and the like stored in the map database 72, to thereby perform route guidance with use of the touch panel 73.

The map information stored in the map database 72 includes road information. The road information includes parameters (e.g., road curvature radius or curvature representing the degree of the curve of the road, and the road lane width) representing the shape of the road for each section of the road. Further, the road information includes road type information for enabling distinction of whether or not the road is a road for exclusive use by automobiles, and information on the number of lanes.

<Control Processing Performed by Driving Support ECU 10>

Next, control processing performed by the driving support ECU 10 is described. Under a situation in which both of the lane trace assist control and the adaptive cruise control are being executed, when the lane change assist request is accepted, the driving support ECU 10 executes the lane change assist control. In view of this, the lane trace assist control and the adaptive cruise control are first described.

<Lane Trace Assist Control (LTA)>

The lane trace assist control provides/generates the steering torque to the steering mechanism so that the position of the own vehicle is maintained in the vicinity of the target travel line inside a "lane in which the own vehicle is traveling", thereby assisting the steering operation of the driver. In this embodiment, the target travel line is the lane center line CL, but a line offset in the road width direction by a predetermined distance from the lane center line CL can also be adopted as the target travel line.

In the following, the lane trace assist control is referred to as an "LTA". The LTA is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210) although the LTA itself has various names. Thus, a brief description on the LTA is now given.

The driving support ECU 10 is configured to carry out the LTA when the LTA is requested by the operation on the setting operation unit 14. When the LTA is requested, the driving support ECU 10 calculates a target steering angle $\theta lta^*$ in accordance with Expression (1) based on the above-mentioned lane-related vehicle information (Cu, Dy, and $\theta y$) every time a predetermined time (calculation period) elapses.

$$\theta lta^* = Klta1 \cdot Cu + Klta2 \cdot \theta y + Klta3 \cdot Dy + Klta4 \cdot \Sigma Dy \quad (1)$$

In Expression (1), Klta1, Klta2, Klta3, and Klta4 are control gains. The first term on the right-hand side is a steering angle component that is determined in accordance with the curvature Cu of the road and acts in a feed-forward manner. The second term on the right-hand side is a steering angle component that acts in the feed-back manner so that the yaw angle $\theta y$ is decreased (so that the difference of the direction of the own vehicle with respect to the lane center line CL is decreased). That is, the second term on the right-hand side is a steering angle component calculated by feed-back control with the target value of the yaw angle $\theta y$ being set to zero. The third term on the right-hand side is a steering angle component that acts in a feed-back manner so that the lateral difference Dy, which is a positional gap (positional difference) between the own vehicle and the lane center line CL in the road width direction, is decreased. That is, the third term on the right-hand side is a steering angle component calculated by feed-back control with the target value of the lateral difference Dy being set to zero. The fourth term on the right-hand side is a steering angle component that acts in a feed-back manner so that an integral value $\Sigma Dy$ of the lateral difference Dy is decreased. That is, the fourth term on the right-hand side is a steering angle component calculated by feed-back control with the target value of the integral value $\Sigma Dy$ being set to zero.

A target steering angle $\theta lta^*$ becomes an angle to have the own vehicle travel toward the left direction, for example, when the lane center line CL curves to the left (direction), when the own vehicle is laterally shifted/deviated in the right direction from the lane center line CL, and when the own vehicle is facing to the right (direction) with respect to the lane center line CL. Further, a target steering angle $\theta lta^*$ becomes an angle to have the own vehicle travel toward the right direction, when the lane center line CL curves to the right (direction), when the own vehicle is laterally shifted/deviated in the left direction from the lane center line CL, and when the own vehicle is facing to the left (direction) with respect to the lane center line CL. Therefore, when Expression (1) is calculated, the calculation is only required to be performed with use of symbols corresponding to the right/left direction.

The driving support ECU 10 outputs/transmits, to the EPS ECU 20, a command signal representing the target steering angle $\theta lta^*$ that is the calculation result. The EPS ECU 20 controls the drive of the steering motor 22 so that the steering angle follows (becomes equal to) the target steering angle $\theta lta^*$. In this embodiment, the driving support ECU 10 outputs the command signal representing the target steering angle $\theta lta^*$ to the EPS ECU 20, but the driving support ECU 10 may calculate a target torque for obtaining the target steering angle $\theta lta^*$, and output, to the EPS ECU 20, a command signal representing the target torque that is the calculation result.

The LTA is only used to support the driver's driving operation so that the travel position of the own vehicle follows the lane center line CL. Therefore, even when the LTA is executed, hands-off driving is not allowed, and the driver is required to hold the steering wheel (steering wheel operation is unnecessary).

The above is the outline of the LTA.

<Adaptive Cruise Control (ACC)>

When a preceding vehicle traveling immediately ahead of the own vehicle is present, the adaptive cruise control has the own vehicle follow the preceding vehicle while maintaining an inter-vehicle distance between the preceding vehicle and the own vehicle to a predetermined distance based on the surrounding information. When there is no preceding vehicle, the adaptive cruise control has the own vehicle travel at a constant setting vehicle speed. In the following, the adaptive cruise control is referred to as an "ACC". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description on the ACC is now given.

The driving support ECU 10 is configured to carry out the ACC when the ACC is requested by the operation on the setting operation unit 14. That is, the driving support ECU 10 is configured to select a following-objective-vehicle based on the surrounding information acquired from the surrounding sensors 11 when the ACC is requested. For example, the driving support ECU 10 determines whether or not a relative position of the detected object (n) identified by a lateral distance Daccy(n) and an inter-vehicle distance Daccx(n) of the object (n) is in a following-objective-vehicle area defined in advance. The following-objective-vehicle area is so defined that the lateral distance decreases as the inter-vehicle distance increases. Then, the driving support ECU 10 selects the object (n) as the following-objective-vehicle when the relative position of the object represents the object is in the following-objective-vehicle area for a period equal to or more than a predetermined period.

Further, the driving support ECU 10 calculates a target acceleration Gacc* in accordance with any one of Expression (2) and Expression (3). In Expression (2) and Expression (3), Vaccx(a) is a relative speed of a following-objective-vehicle (a), Kacc1 and Kacc2 are predetermined positive gains (coefficients), and $\Delta$Dacc is an inter-vehicle distance difference (=Daccx(a)−Dacc*) acquired by subtracting the "target inter-vehicle distance Dacc* from an inter-vehicle distance Daccx(a) of the following-objective-vehicle (a)". The target inter-vehicle distance Dacc* is calculated by multiplying a target inter-vehicle period Tacc* set by the driver using the setting operation unit 14 by the vehicle speed V of the own vehicle (that is, Dacc*=Tacc*·V).

The driving support ECU 10 uses Expression (2) to determine the target acceleration Gacc* when the value (Kacc1·ΔDacc+Kacc2·Vaccx(a)) is positive or "0". Kacca1 is a positive gain (coefficient) for acceleration, and is set to a value equal to or less than "1".

The driving support ECU 10 uses Expression (3) to determine the target acceleration Gacc* when the value (Kacc1·ΔDacc+Kacc2·Vaccx(a)) is negative. Kaccd1 is a gain (coefficient) for deceleration, and is set to "1" in this example.

$$Gacc^*(\text{for acceleration})=Kacca1 \cdot (Kacc1 \cdot \Delta Dacc + Kacc2 \cdot Vaccx(a)) \quad (2)$$

$$Gacc^*(\text{for deceleration})=Kaccd1 \cdot (Kacc1 \cdot \Delta Dacc + Kacc2 \cdot Vaccx(a)) \quad (3)$$

When no object is present in the following subject vehicle area, the driving support ECU 10 determines the target acceleration Gacc* based on a "target speed set in accordance with the target inter-vehicle distance Tacc*" and the vehicle speed V so that the vehicle speed V matches the set target speed.

The driving support ECU 10 uses the engine ECU 50 to control the engine actuator 51, and, depending on necessity, uses the brake ECU 60 to control the brake actuator 61 so that the acceleration of the own vehicle matches (becomes equal to) the target acceleration Gacc*.

Further, during the ACC, the driving support ECU 10 reads, from the navigation ECU 70, information representing the curvature of the road that is a predetermined distance ahead of the position of the own vehicle (prefetches the road curvature), and sets an upper-limit speed of the own vehicle, which decreases as the curvature increases (as the curve becomes steeper), to thereby limit the vehicle speed so that the vehicle speed of the own vehicle does not exceed the upper-limit speed. In the following, such control is preferred to as "speed management".

The above is the outline of the ACC.

<Lane Change Assist Control (LCA)>

The lane change assist control refers to the following control. After the surrounding of the own vehicle is monitored and it is determined that the own vehicle can safely change lanes, the lane change assist control provides/generates a steering torque to the steering mechanism so that the lane change assist control has the own vehicle move from the lane in which the own vehicle is currently traveling to the adjacent lane while monitoring the surrounding of the own vehicle. Thus, the driver's steering operation (lane change operation) is assisted. Therefore, the lane change assist control can have the own vehicle change lanes in which the own vehicle travels without the driver's steering operation (steering wheel operation). In the following, the lane change assist control is referred to as "LCA".

Similarly to the LTA, the LCA is control of a lateral position with respect to the lane of the own vehicle, and is executed in place of the LTA when the lane change assist request is accepted while the LTA and the ACC are being executed. In the following, the LTA and the LCA are collectively referred to as "steering assist control", and the state of the steering assist control is referred to as "steering assist control state".

<Calculation of Target Trajectory>

Figure 5:
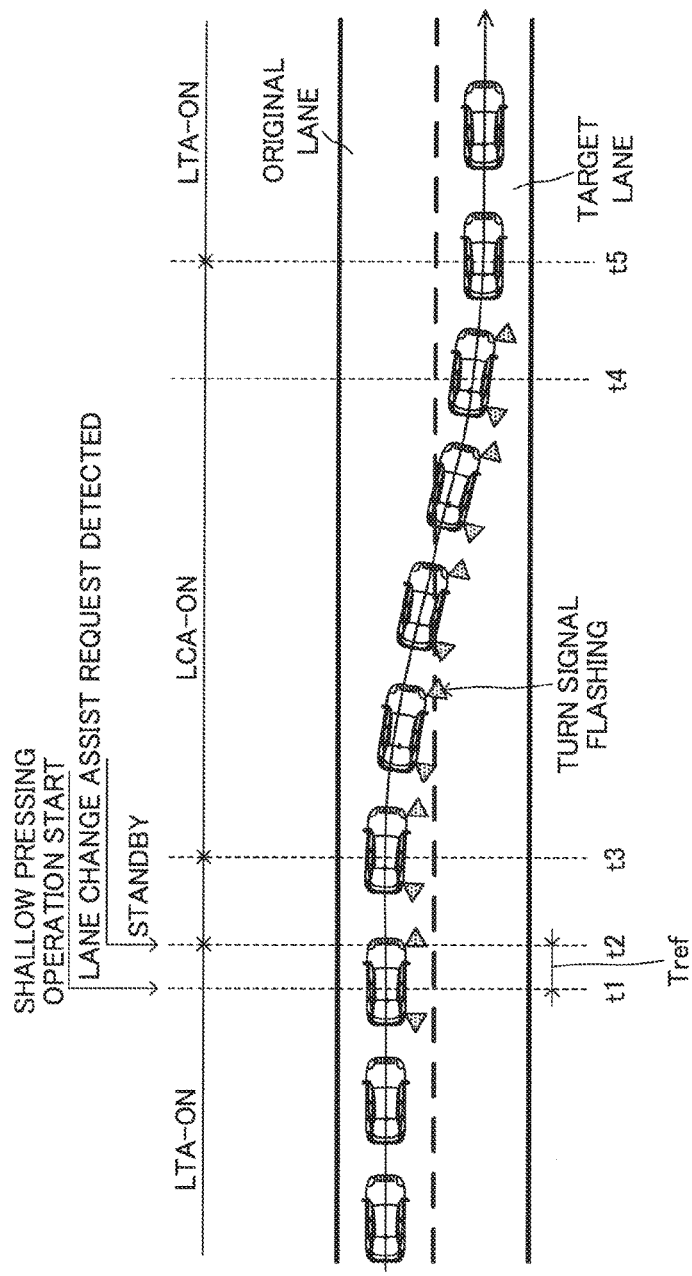
FIG. 5 is a diagram for illustrating a steering assist control state and a trajectory of an own vehicle.

When the driving support ECU 10 executes the LCA, the driving support ECU 10 calculates a target trajectory of the own vehicle based on the lane information at the current time point, which is supplied from the camera sensor 12, and on the vehicle state of the own vehicle. The target trajectory is a trajectory along which the own vehicle is to be moved for the target lane change time period from the lane (referred to as an "original lane") in which the own vehicle is currently traveling to the center position in the width direction (referred to as a "final target lateral position") of the lane (referred to as a "target lane") specified by the lane change assist request direction, which is adjacent to the original lane. The target trajectory has, for example, a shape as illustrated in FIG. 5. The target trajectory is represented with use of a target lateral position y(t) of the own vehicle with respect to the lane center line CL of the original lane (see FIG. 3), wherein "t" is an elapsed time (period) from the (actuation) start time point of the LCA.

In this embodiment, the target lane change time period is set to be variable in proportion to the distance of moving the own vehicle in the lateral direction to the final target lateral position (hereinafter referred to as "necessary lateral distance"). When the lane width is 3.5 m as in the case of general roads, the target lane change time period is set to, for example, 8.0 seconds. This example corresponds to a case in which the own vehicle is positioned on the lane center line CL of the original lane at the start of the LCA. When the lane width is, for example, 4.0 m, the target lane change time period is set to a value corresponding to the lane width, in this example, to 9.1 seconds (=8.0×4.0/3.5).

Further, when the lateral-direction position of the own vehicle at the start of the LCA is shifted to the lane change side with respect to the lane center line CL of the original lane, the target lane change time period is set to be decreased as the shift amount (lateral difference Dy) is increased. On the other hand, when the lateral-direction position of the own vehicle at the start of the LCA is shifted to the opposite side of the lane change side with respect to the lane center line CL of the original lane, the target lane change time period is set to be increased as the shift amount (lateral difference Dy) is increased. For example, when the shift amount is 0.5 m, the increase/decrease adjustment amount of the target lane change time period may be 1.14 seconds (=8.0×0.5/3.5).

In this embodiment, a target lateral position y is calculated in accordance with a target lateral position function y(t) expressed by Expression (4). The lateral position function y(t) is a fifth-order function using the elapsed time period t.

$$y(t)=a \cdot t^5 + b \cdot t^4 + c \cdot t^3 + d \cdot t^2 + e \cdot t + f \quad (4)$$

In Expression (4), the constants a, b, c, d, e, and f are determined based on the travel state of the own vehicle, the lane information, the target lane change time period, and the like at the time of the calculation. In this embodiment, a vehicle model stored in advance is used, and the travel state of the own vehicle, the lane information, and the target lane change time period are input to the vehicle model. Thus, the above-mentioned constants a, b, c, d, e, and f are calculated so that a smooth target trajectory can be obtained. The calculated constants a, b, c, d, e, and f are substituted into Expression (4) to obtain the target lateral position function y(t). The elapsed time period t from the LCA start time is substituted into the target lateral position function y(t), and thus the target lateral position at that time point can be obtained. In this case, f represents an initial lateral position of the own vehicle when t=0 is established, that is, when the LCA is started, and hence f is set to a value equal to the lateral difference Dy.

The target lateral position y can be set by any method. For example, other than the above-mentioned calculation method, the driving support ECU 10 may store in advance a plurality of lateral position functions y(t), each having the constants a to f set for every necessary lateral distance required for laterally moving the own vehicle to the final target lateral position, and the driving support ECU 10 may select, from the plurality of lateral position functions y(t), a lateral position function y(t) corresponding to the necessary lateral distance and the target lane change time period used when the LCA is started.

Further, the target lateral position y is not required to be calculated with use of the fifth-order function, and may be obtained with use of a function set as appropriate.

<Calculation of Target Steering Angle>

The driving support ECU 10 is executing the LTA before the LCA is started. In the LTA, the target steering angle is calculated as described above, and the steering torque is generated so that the actual steering angle coincides with (matches) the target steering angle. Also in the LCA, similarly to the LTA, the driving support ECU 10 calculates the target steering angle, and the steering torque is generated so that the actual steering angle coincides with (matches) the target steering angle.

When the target steering angle is calculated for the LCA, it is only required to change the target values of the curvature, the yaw angle, and the lateral difference of the calculation expression for the target steering angle in the LTA. That is, in the LTA, the target value of the curvature is set to the curvature of the lane in which the own vehicle travels, and the target values of the yaw angle and the lateral difference are set to zero. In contrast, in the LCA, a target curvature $Cu^*$, a target yaw angle $\theta y^*$, and a target lateral difference $Dy^*$ are determined based on the shape of the target trajectory represented by Expression (4).

The driving support ECU 10 calculates a target steering angle $\theta lca^*$ as a control amount of the LCA based on Expression (5) every time a predetermined time (calculation period) elapses.

$$\theta lca^* = Klca1 \cdot Cu^* + Klca2 \cdot (\theta y^* - \theta y) + Klca3 \cdot (Dy^* - Dy) + Klca4 \cdot \Sigma(Dy^* - Dy) \quad (5)$$

In Expression (5), values in the lane-related vehicle information (Cu, Dy, and $\theta y$) at the current time point (at the time of calculation) are used for $\theta y$ and Dy. Klca1, Klca2, Klca3, and Klca4 are control gains.

The first term on the right-hand side is a steering angle component that acts in a feed-forward manner and is determined in accordance with the target curvature $Cu^*$ determined based on the shape of the target trajectory. The second term on the right-hand side is a steering angle component that acts in the feed-back manner so that the difference between the target yaw angle $\theta y^*$ determined based on the shape of the target trajectory and the actual yaw angle $\theta y$ is decreased. The third term on the right-hand side is a steering angle component that acts in a feed-back manner so that the difference between the target lateral difference $Dy^*$ determined based on the shape of the target trajectory and the actual lateral difference Dy is decreased. The fourth term on the right-hand side is a steering angle component that acts in a feed-back manner so that an integral value $\Sigma(Dy^* - Dy)$ of the difference between the target lateral difference $Dy^*$ and the actual lateral difference Dy is decreased. In this manner, the target steering angle $\theta lca^*$ is calculated as the control amount of the LCA, and thus smooth transition from the LTA to the LCA can be achieved.

The driving support ECU 10 transmits a steering command representing the target steering angle $\theta lca^*$ to the EPS ECU 20 every time the driving support ECU 10 calculates the target steering angle $\theta lca^*$. In this manner, the own vehicle travels along the target trajectory to change lanes.

<Steering Assist Control Routine>

Figure 6:
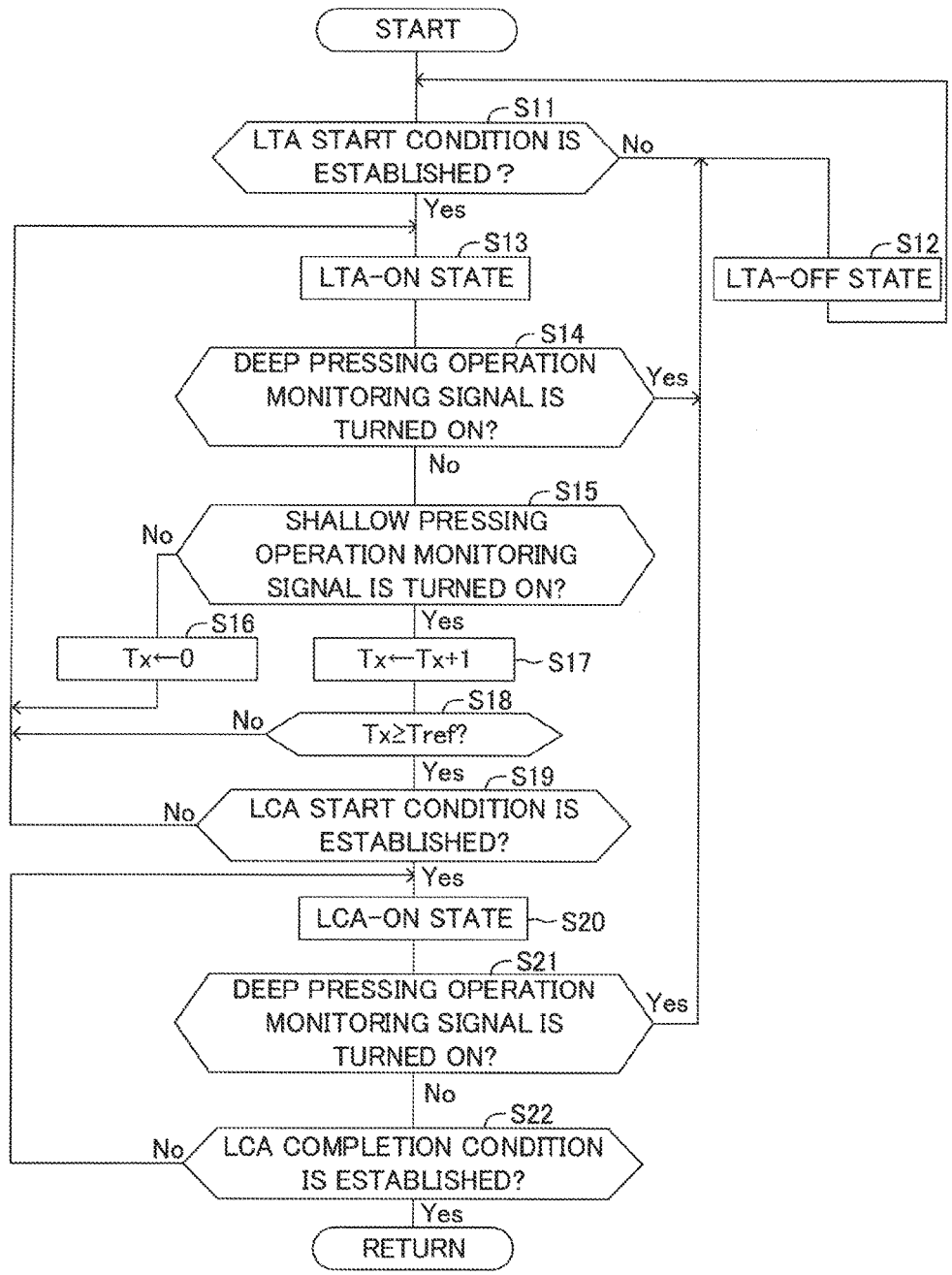
FIG. 6 is a flowchart for illustrating a steering assist control routine of the embodiment.

Next, the steering assist control for the LTA and the LCA that are switched therebetween is described. FIG. 6 is an illustration of a steering assist control routine to be executed by the driving support ECU 10. While an ignition switch is turned on, the driving support ECU 10 executes repeatedly the steering assist control routine.

When the steering assist control routine is activated, in Step S11, the driving support ECU 10 determines whether or not LTA start condition set in advance is established.

For example, the LTA start condition is established when all of the following conditions are established.

1-1. Execution of the LTA has been selected by the setting operation unit 14.

1-2. The ACC is being executed.

1-3. The vehicle speed is within a predetermined vehicle speed range.

1-4. The white lines have been recognized.

1-5. The deep pressing operation on the turn signal lever 41 has not been detected.

The LTA start condition is not limited to the above-mentioned condition, and can be set as appropriate.

When the LTA start condition is not established (S11: No), the driving support ECU 10 proceeds the process to Step S12 and sets the steering assist control state to an LTA-OFF state. The LTA-OFF state represents a control state in which the LTA is not executed. Therefore, in the LTA-OFF state, the driver has to perform a steering operation (steering wheel operation) manually.

When the driving support ECU 10 sets the steering assist control state to the LTA-OFF state, the driving support ECU 10 returns the process to the Step S11. The driving support ECU 10 repeats these processes (S11-S12) until the LTA start condition is established.

When the LTA start condition is established (S11:Yes), in Step S 13, the driving support ECU 10 sets the steering assist control state to a LTA-ON state. The LTA-ON state represents a control state in which the LTA is executed. Thus, the driving support ECU 10 starts the LTA.

Subsequently, in Step S14, the driving support ECU 10 determines whether or not the deep pressing operation monitoring signal transmitted by the steering ECU 40 is "on" (either of the second switches 412L and 412R is in an on state). A situation in which the deep pressing operation monitoring signal is "on" represents (corresponds to) a situation in which the driver has performed the deep pressing operation on the turn signal lever 41. When the deep pressing operation monitoring signal is not "on", that is, when the deep pressing operation is not detected, the driving support ECU 10 proceeds the process to Step S15.

The driving support ECU 10 determines whether or not the shallow pressing operation monitoring signal transmitted by the steering ECU 40 is "on" (either of the first switches 411L and 411R is in an on state). When the shallow pressing operation monitoring signal is not "on" (S15: No), the driving support ECU 10, in Step S16, resets (Tx=0) a value of a timer (referred to as "timer value Tx") for counting an ON duration time period in which the shallow pressing operation monitoring signal is continued to be" "on" (an ON duration time period in which either of the first switches 411L and 411R is continued to be in the on state), and returns the process to Step S13.

In this manner, the above described Steps S13-S16 are repeated and the LTA is continued under a situation in which the deep pressing operation or the shallow pressing operation on the turn signal lever 41 is not detected.

When the deep pressing operation monitoring signal is "on" (S14:Yes), that is, the deep pressing operation is detected, while the LTA is being executed, the driving support ECU 10 proceeds the process to Step S12, and sets the steering assist control states to the LTA-OFF state. Therefore, the LTA which has been executed until that time point is stopped.

When the shallow pressing operation monitoring signal is "on", that is, the shallow pressing operation is detected, under a situation in which the LTA is being executed (S15:Yes), the driving support ECU 10, in Step S17, increments the timer value Tx by "1". Subsequently, the driving support ECU 10, in Step S18, determines whether or not the timer value Tx is equal to or larger than an assist request confirmation time period Tref.

The assist request confirmation time period Tref is a time period to confirm the driver's request for the lane change assist. For example, the assist request confirmation time period Tref is set to about one second.

When the timer value Tx has not reached the assist request confirmation time period Tref (when a duration time period of shallow pressing operation on the turn signal lever 41 by the driver has not reached the assist request confirmation time period Tref), the driving support ECU 10 returns the process to Step S13. Therefore, the LTA continues as it is.

While those processes are being repeated, when the shallow pressing operation monitoring signal is turned off (when the driver releases the shallow pressing operation on the turn signal lever 41) before the timer value Tx reaches the assist request confirmation time period Tref, the driving support ECU 10 resets the timer value Tx (S15: No, S16).

On the other hand, when the timer value Tx has reached the assist request confirmation time period Tref (S18:Yes), the driving support ECU 10, in Step S19, determines whether or not an LCA start condition becomes established. When the timer value Tx has reached the assist request confirmation time period Tref, the driving support ECU 10 determines that the driver is requesting the lane change assist. In other words, when the timer value Tx has reached the assist request confirmation time period Tref, the driving support ECU 10 detects the lane change assist request from the driver.

For example, the LCA start condition is established when all of the following conditions are established.

2-1. Execution of the LCA has been selected by the setting operation unit 14.

2-2. The white line at a side corresponding to the turn signal operation direction (white line serving as a boundary between the original lane and the target lane) is a broken line.

2-3. The result of determining whether or not the LCA can be executed based on the monitoring of the surrounding is YES (object (another vehicle or the like) that becomes an obstacle impeding the lane change has not been detected by the surrounding sensors 11, and it is determined that the own vehicle can safely change lanes).

2-4. The road is a road for exclusive use by automobiles (road type information acquired from the navigation ECU 70 represents a road for exclusive use by automobiles).

For example, the condition 2-3 is established when the inter-vehicle distance between the own vehicle and another vehicle that travels in the target lane is appropriately ensured, in consideration of a relative speed therebetween.

The LCA start condition is not limited to the above-mentioned condition, and can be set as appropriate.

When the LCA start condition is not established (S19: No), the driving support ECU 10 returns the process to Step S13 to repeat the above processes. In this manner, the driving support ECU 10 counts (measures) the duration time period of shallow pressing operation on the turn signal lever 41 and determines whether or not the LCA start condition is established.

When the LCA start condition is established (S19:Yes), the driving support ECU 10 proceeds the process to Step S20 and sets the steering assist control state to a LCA-ON state. The LCA-ON state represents a state in which the LCA is executed. In this manner, the driving support ECU 10 terminates the LTA that has been executed to start the LCA. In other words, when the LCA start condition is established in Step S19, the driving support ECU 10 accepts the lane change assist request from the driver When the driving support ECU 10 starts the LCA, the driving support ECU 10 sounds the buzzer 13 for a short time period to notify the driver of starting the LCA. For example, the driving support ECU 10 may display a screen to notify the driver of starting the LCA on the display unit 31. In this case, the driving support ECU 10 transmits a display command representing the start of LCA to the meter ECU 30. The meter ECU 30 displays the screen to notify the driver of starting the LCA on the display unit 31 in accordance with the display command.

When the driving support ECU 10 starts the LCA, the driving support ECU 10 has the own vehicle move to the target lane after an elapse of a predetermined standby time period from the acceptance of the lane change assist request. In this manner, a state in which the turn signal 32 is being intermittently flashed without a substantial lane change actuation continues for a predetermined time period. The steering control performed during this standby time period is the same steering control as the LTA.

The driving support ECU 10 calculates a target steering angle θlca* and transmits a steering command representing the calculated target steering angle θlca* to the EPS ECU 20 while the driving support ECU 10 is executing the LCA. In this manner, the own vehicle travels along the target trajectory to change lanes so that the lane change is executed.

When the driving support ECU 10 starts the LCA, the driving support ECU 10, in Step S21, determines whether or not the deep pressing operation monitoring signal is "on" (either one of the second switches 412L and 412R is the on state.). This determining process is the same as the determining process of Step S14. When the deep pressing operation monitoring signal is not "on" (S21: No), that is, when the deep pressing operation is not detected, the driving support ECU 10 proceeds the process to Step S22, and determines whether or not the LCA completion condition is established.

The LCA completion condition is established when an elapsed time period from the start of the LCA reaches a target lane change time period. The target lane change time period is a time period for which the own vehicle reaches the target lane, in other words, a time period for which the own vehicle completes the lane change by a single lane. Therefore, the LCA completion condition implies an LCA completion condition for a single lane change from the original lane to the lane (target lane) immediately adjacent to the original lane. When the LCA completion condition is not established, the driving support ECU 10 returns the process to Step S20. Therefore, the LCA is continued.

When the deep pressing operation monitoring signal is "on" (S21:Yes), that is, when the deep pressing operation is detected, under a state in which the LCA is being executed, the driving support ECU 10 proceeds the process to Step S12, and sets the steering assist control state to an LTA-OFF state. Therefore, the driving support ECU 10 stops the LCA that has been executed.

When the LCA completion condition is established (S22: Yes) before the deep pressing operation monitoring signal is turned on, that is, before the deep pressing operation has been detected, the driving support ECU 10 completes the LCA and tentatively terminates the steering assist control routine. When a predetermined short time period elapses from tentatively terminating the steering assist control routine, the driving support ECU 10 restarts the steering assist control routine. Therefore, when the LTA start condition is established at a timing of restarting of the steering assist control routine, the LTA is restarted. In other words, the LTA instead of the LCA is executed.

The driving support ECU 10 determines whether or not a LTA cancel condition set in advance is established while the driving support ECU 10 is executing the LTA (S13-S19). When the LTA cancel condition is established (for example, when the LTA start condition becomes unsatisfied), the driving support ECU 10 may return the process to Step S12. The driving support ECU 10 determines whether or not a LCA cancel condition set in advance is established while the driving support ECU 10 is executing the LCA (S20-S22). When the LCA cancel condition is established (for example, when the LCA start condition becomes unsatisfied), the driving support ECU 10 may return the process to Step S11.

Figure 9:
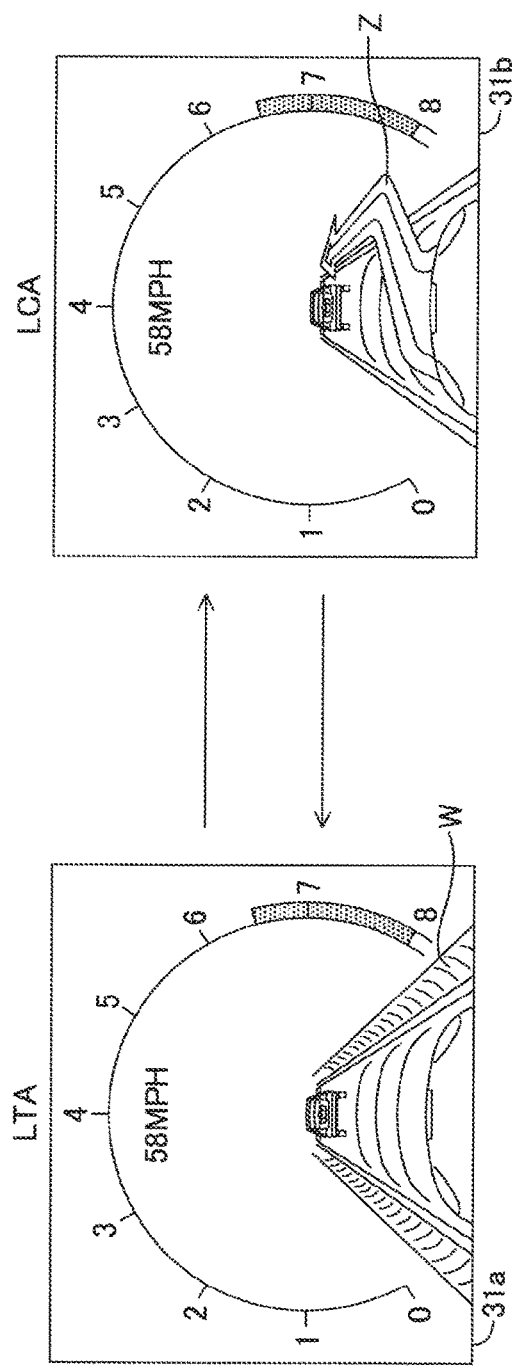
FIG. 9 is a diagram for illustrating a display screen.

FIG. 9 is an illustration of an example of a screen 31a (referred to as "LTA screen 31a") displayed on the display unit 31 while the LTA is being executed and a screen 31b (referred to as "LCA screen 31b") displayed on the display unit 31 while the LCA is being executed. Each of the LTA screen 31a and the LCA screen 31b represents a state in which the own vehicle is traveling in a lane between a left white line and a right white line. Virtual walls W outside the left white line and the right white line are displayed on the LTA screen 31a. The driver can recognize, based on the walls W, a state in which the own vehicle is controlled in such a manner that the own vehicle travels inside the lane. On the other hand, the walls W are not displayed on the LCA screen 31b and a trajectory Z of the LCA instead of the walls W is displayed on the LCA screen 31b. The driving support ECU 10 changes the screens between the LTA screen 31a and the LCA screen 31b in response to an execution state of the steering assist control. In this manner, the driver can easily recognize whether the LTA or the LCA is being executed.

Figure 7:
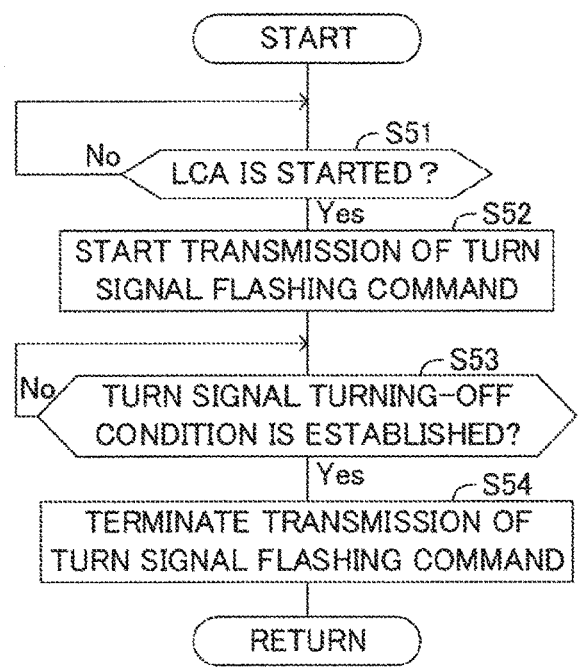
FIG. 7 is a flowchart for illustrating a flashing control of a turn signal of the embodiment.

The driving support ECU 10 executes a turn signal flashing control routine in parallel with the steering assist control routine. The turn signal flashing control routine executed by the driving support ECU 10 is illustrated in FIG. 7.

When the turn signal flashing control routine is activated, in Step S51, the driving support ECU 10 determines whether or not the LCA has been started. In this determination, the driving support ECU 10 only have to determine whether or not the LCA start condition has been established. The deriving support ECU 10 repeats the determination of Step S51 until the LCA is started.

When the LCA is started, the driving support ECU 10, in Step S52, starts transmitting the flashing command of the turn signal corresponding to the turn signal operation direction to the meter ECU 30. The intermittently-flashing of the turn signal 32 is started in response to a flashing command which the steering ECU 40 transmits when the shallow pressing operation on the turn signal lever 41 is performed before the LCA is started. Even if (after) the steering ECU 40 stops transmitting the flashing command, the intermittently-flashing of the turn signal 32 continues in response to the flashing command which the driving support ECU 10 transmits in Step S52.

Then, the driving support ECU 10 determines whether or not a turn signal turning-off condition is established in Step S53. The turn signal turning-off condition is established when both of the following conditions 3-1 and 3-2 are established.

3-1. The own vehicle has already crossed the white line.

3-2. The lateral-direction distance between the current position of the own vehicle and the final target lateral position is equal to or smaller than a turning-off allowance distance.

Figure 8:
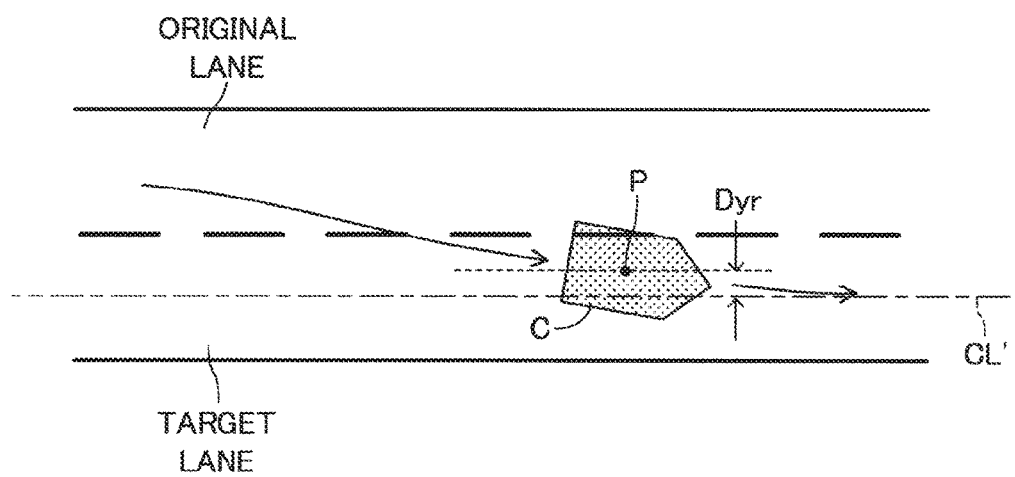
FIG. 8 is a diagram for illustrating a turning-off allowance distance.

For example, the condition 3-1 is established when it is detected that the reference point P of the own vehicle has crossed the white line (broken line) serving as the boundary between the original lane and the target lane. Further, the condition 3-2 is established when a state is detected in which, as illustrated in FIG. 8, a lateral-direction distance Dyr from the reference point P of the own vehicle C to a lane center line CL' (center line in the width direction) of the target lane becomes equal to or smaller than a turning-off allowance distance Doff that is larger than zero. The lateral-direction distance Dyr is a distance in the lane width direction from the current position of the own vehicle to the final target position, that is, the remaining distance in the lane width direction required until the LCA is completed, and hence this lateral-direction distance Dyr is hereinafter referred to as "remaining distance Dyr". The driving support ECU 10 calculates, every time a predetermined time (calculation period) elapses, the remaining distance Dyr from the reference point P of the own vehicle to the lane center line CL' of the target lane, and compares the remaining distance Dyr with the turning-off allowance distance Doff, to thereby determine whether or not the above-mentioned condition 3-2 is established. The reference point P used for the determination on whether or not the condition 3-1 is established is not limited to the position of the center of gravity, and is only required to be a specific position (specific point) of the own vehicle set in advance. Further, in determining whether or not the reference point P crosses the white line, it is only required to determine whether or not the reference point P crosses a line determined in advance, for example, an inner line, an outer line, or a center line of the white line.

The turning-off allowance distance Doff is set to a value (e.g., 50 cm) larger than zero in such a manner that the turn signal 32 is turned-OFF before the LCA is completed.

The driving support ECU 10 repeats the determination of Step S53 until the turn signal turning-off condition is established. When the turn signal turning-off condition is established (S53:Yes), the driving support ECU 10, in Step S54, terminates transmitting the flashing command of the turn signal 32, and tentatively terminates the turn signal flashing control routine. The driving support ECU 10 restarts at once the turn signal flashing control routine after tentatively terminating the turn signal flashing control routine.

FIG. 5 is an illustration of an example of the trajectory of the own vehicle when the LCA is executed. At a time t1, the intermittently-flashing of the turn signal 32 is started in response to the shallow pressing operation on the turn signal lever 41. Then, at a time t2 at which the duration time period of the shallow pressing operation reaches the assist request confirmation time period Tref, the driving support ECU 10 detects the lane change assist request. When the LCA start condition is established, the driving support ECU 10 accepts the lane change assist request, starts the LCA, and starts transmitting the flashing command of the turn signal 32 to the meter ECU 30. A standby state to prohibit the own vehicle to perform the lane change actuation continues until the standby time period elapses from the start of the LCA. The steering control performed during this standby time period is same as the LTA.

The own vehicle starts travelling along the target trajectory at a time t3 when the standby time period elapses. When the own vehicle has crossed the white line and the remaining distance Dyr becomes equal to or smaller than the turning-off allowance distance Doff (time t4), the turn signal is turned-off. Thereafter, when the own vehicle reaches the final target lateral position (time t5), the LCA is completed.

According to the lane change assist device for the vehicle of this embodiment described above, when the shallow pressing operation performed on the turn signal lever 41 is continued for the assist request confirmation time period or more under the state in which the LTA is being executed, the lane change assist request from the driver is confirmed/finalized (the lane change assist request is detected.). The deep pressing operation is performed on the turn signal lever 41 under the state in which the steering assist control (the LCA and the LTA) is being executed, a stop request for the steering assist control is confirmed/finalized.

The driver continues the shallow pressing operation on the turn signal 41 for the assist request confirmation time period or more so that the driver can convey the driver's intention to obtain/receive the lane change assist to the lane change assist device. The driver performs the deep pressing operation on the turn signal lever 41 so that the driver can convey the driver's intention to change lanes by the driver's steering operation without the lane change assist. Therefore, by simply switching/selecting the operation strokes on the turn signal lever 41, the driver can convey either one of the lane change assist request and the stop request for the steering assist control to the driving support ECU 10 distinctively.

When the driver has an intention to perform the lane change manually by himself/herself, the driver performs the deep pressing operation corresponding to a lane change direction. This allows the driver to intermittently flash the turn signal 32 without starting the lane change assist. Therefore, the driver can perform the steering operation to change lanes manually with intermittently flashing the turn signal 32. In this case, the steering assist control is stopped. Thus, the steering operation by the driver is not disturbed by the steering assist control. As a result, the lane change is performed smoothly.

When the driver has an intention to have the turn signal 32 intermittently flash in a state "in which the lane change is not performed and the LTA is continued", the driver only performs the shallow pressing operation on the turn signal lever 41 for a short time period (a time period which is shorter than the assist request confirmation time period). As a result, the driver can have the turn signal 32 intermittently flash without stopping the LTA.

As described above, according to the lane change assist device for the vehicle of this embodiment, the driver operates the turn signal lever 41 so as to easily select a lane change mode from an automatic mode or a manual mode, easily select a turn signal flash mode from a flash mode with the lane change assist or a flash mode without the lane change assist, and easily select either one of execution and stop of the steering assist control. Therefore, very good operability can be achieved. Further, a special operation unit to make the selections described above is unnecessary. Thus, the cost can be reduced, and the space can be saved.

Further, in order for the lane change assist request to be accepted/confirmed, the shallow pressing operation on the turn signal lever 41 is required to be continued for the assist request confirmation time period Tref or more. Therefore, the driver's intention to receive the lane change assist can be appropriately detected.

In the above, the lane change assist device for a vehicle according to the embodiment has been described, but the present invention is not limited to the above-mentioned embodiment, and various changes are possible within the range not departing from the object of the present invention.

For example, in the embodiment, the LCA is executed on the requisite condition that the steering assist control state is the LTA-ON state (state in which the LTA is being executed), but such requisite condition is not necessarily required.

In the embodiment, the turn signal 32 is turned off before the completion of the LCA, but the turn signal turning-off condition can be set as appropriate (for example, the turn signal 32 is turned off at the same time as the completion of the LCA.).

What is claimed is:

1. A lane change assist device for a vehicle, comprising:
   a meter electronic control unit (ECU) programmed to intermittently flash a turn signal;
   a driving support electronic control unit (ECU) programmed to:
   detect a lane change assist request in response to an operation performed on a turn signal lever by a driver;
   start a lane change assist control to change lanes in which an own vehicle is traveling in response to the detection of the lane change assist request,
   wherein,
   the turn signal lever is configured to be able to be operated selectively between a first operation position which is a position at which the turn signal lever is rotated by a first stroke from a neutral position and at which the turn signal is intermittently flashed, and a second operation position which is a position at which the turn signal lever is rotated by a second stroke larger than the first operation position from the neutral position and at which the turn signal is intermittently flashed, in each of a right turn operation direction and a left turn operation direction, and to return to the neutral position when an operation force is released under a situation in which the turn signal lever positions at the first operation position,
   the driving support ECU is further programmed to:
   measure a time period for which the turn signal lever is held at the first operation position and to detect the lane change assist request when the measured time period is equal to or longer than an assist request confirmation time period set in advance, and
   stop the lane change assist control when the turn signal lever is operated to the second operation position while the lane change assist control is being executed.

2. The lane change assist device for a vehicle according to claim 1, wherein the driving support ECU is further programmed to intermittently flash the turn signal during a time period in which the turn signal lever positions at the first operation position or to intermittently flash the turn signal by a set number of times set in advance, in a case where the turn signal lever positions at the first operation position, and to intermittently flash the turn signal until a return operation is performed on the turn signal lever or a return operation is performed on a steering handle, in a case where the turn signal lever positions at the second operation position.

3. The lane change assist device for a vehicle according to claim 1, wherein the driving support ECU is further programmed to intermittently flash the turn signal from a start of the lane change assist control to an establishment of a turn signal turning-off condition set in advance.

* * * * *